United States Patent

Holland

[15] 3,668,078
[45] June 6, 1972

[54] FRACTIONAL DISTILLATION BYPASS CONTROL PROCESS

[72] Inventor: Eric O. Holland, Borger, Tex.

[73] Assignee: Phillips Petroleum Company

[22] Filed: Apr. 25, 1969

[21] Appl. No.: 819,145

[52] U.S. Cl.................................203/3, 202/160, 137/386, 203/DIG. 18
[51] Int. Cl.........................................................B01d 3/42
[58] Field of Search..................203/3, DIG. 18; 202/160; 196/132; 260/676, 137, 386

[56] References Cited

UNITED STATES PATENTS

| | | |
|---|---|---|
| 2,885,863 | 5/1959 | Berger..........................203/DIG. 18 |
| 2,977,289 | 3/1961 | Kron...........................................203/3 |
| 3,020,213 | 2/1962 | Lupter......................................202/206 |
| 3,067,766 | 12/1962 | Connell ...................................137/386 |
| 3,111,460 | 11/1963 | Orr............................................202/206 |
| 3,230,154 | 1/1966 | Walker ...........................203/DIG. 18 |
| 3,269,922 | 8/1966 | Price et al.................................203/3 |
| 3,442,767 | 5/1969 | Hall...........................................203/3 |
| 3,532,956 | 10/1970 | Simon.......................................137/386 |

Primary Examiner—Wilbur L. Bascomb, Jr.
Attorney—Young and Quigg

[57] ABSTRACT

The composition of the overhead or bottoms product of a distillation is analyzed and a portion of the feed is passed directly to a recovery step when an analyzer output indicates a predetermined composition of the overhead or bottoms product.

5 Claims, 1 Drawing Figure

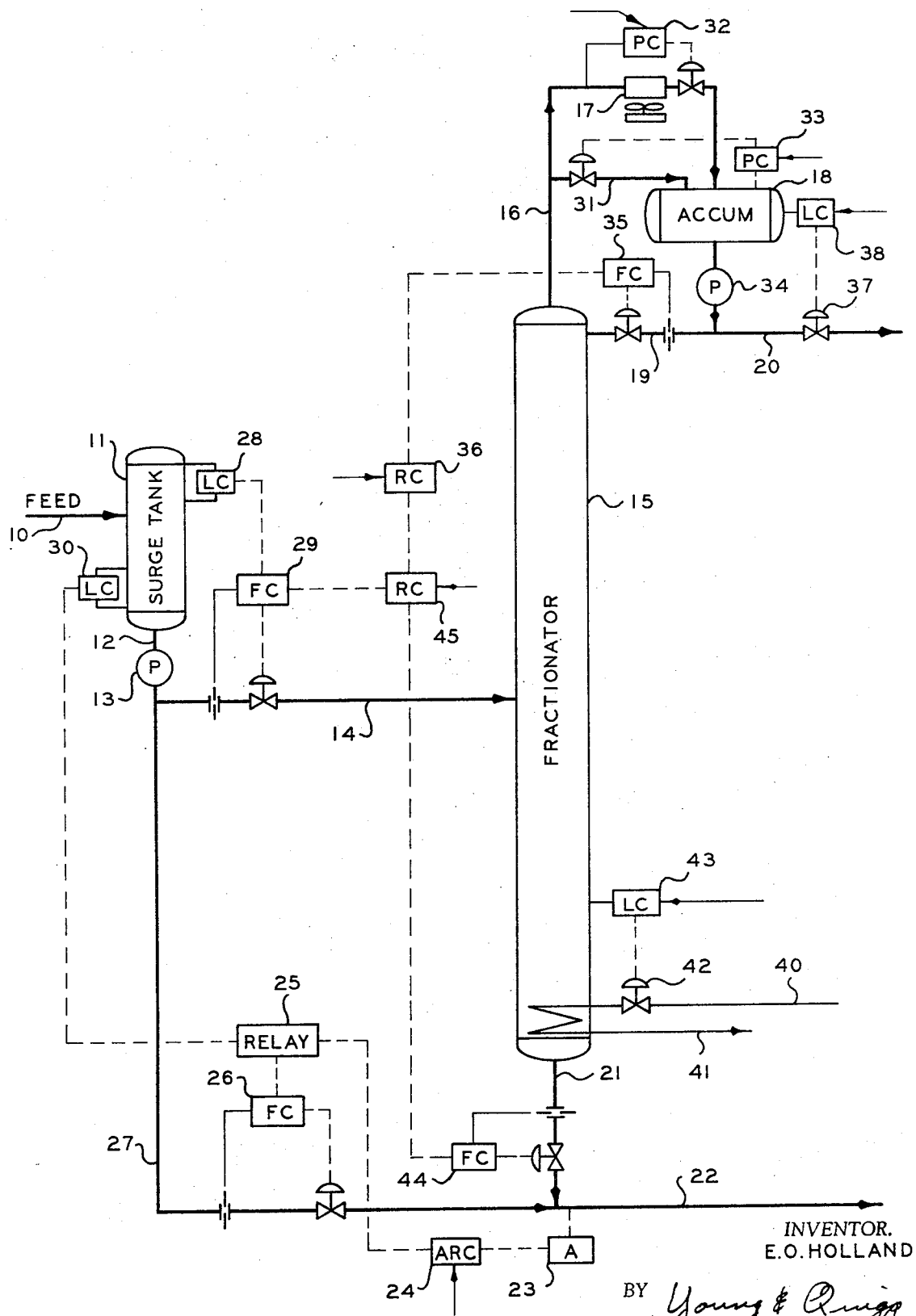

FRACTIONAL DISTILLATION BYPASS CONTROL PROCESS

BACKGROUND OF THE INVENTION

This invention relates to fractional distillation. In many fractional distillation systems, particularly clean-up columns, there is little separation when the feed is relatively pure. It is not desirable to shut down the column during such periods because fouling of the column heating element or other difficulties may occur. The shutdown of the column and subsequent starting thereof consumes labor, and time is normally required to "line out" the column after it is re-started. However, operation of the column in the normal manner during such periods is uneconomical of utilities, as it is necessary to supply reboiler heat, tower cooling, and reflux pump horsepower.

BRIEF STATEMENT OF THE INVENTION

I have discovered that the aforementioned problems can be satisfactorily solved by analyzing one of the output streams, i.e., the overhead product stream or bottoms product stream, of the fractionation column. When the product is of greater than a predetermined purity, a portion of the feed is bypassed around the column and passes directly to the product line. This effects a substantial savings in utility costs since the bypassed material need not be processed in the fractionation column.

Preferably and advantageously, the composition analyzer changes the amount of feed bypassing the column in intermittent stepwise fashion. This provides increased stability of column operation because it tends to eliminate "hunting" of the product composition about its predetermined desired value.

A feature of the invention resides in passing the feed to the fractionation column through a surge tank which is equipped with a low level controller. When the level in the surge tank drops below this predetermined setting, the bypass control function of the composition analyzer is interrupted and all of the feed is passed to the fractionation column regardless of its purity.

The control method of the invention can be used very advantageously in conjunction with an overhead product accumulator from which liquid is discharged at a desired constant or feed-dependent flow rate into the fractionation column as reflux, the quantity of heat supplied to the fractionator being varied so as to maintain a desired reboiler level or a desired constant temperature at a preselected region of the column.

It will be apparent from the foregoing description that the process of the invention can be applied to a variety of distillation systems. It is particularly suitable for "clean-up" columns where a small amount of impurity is to be removed from a rather large product stream. In this instance, utility costs can be saved by bypassing the maximum amount of feed into the bottom product or overhead product, as the case may be, while yet maintaining a predetermined product purity.

Accordingly, it is an object of the invention to improve the efficiency of fractional distillation processes.

It is a further object to reduce utility costs, such as reboiler heat supply, reflux cooling, and reflux pump horsepower in fractional distillation systems.

It is a still further object to keep a clean-up distillation column in readiness for operation at all times at minimum utility costs.

Various other objects, advantages and features of the invention will become apparent from the following detailed description taken in conjunction with the accompanying drawing, in which:

The FIGURE is a flow diagram of a distillation system constructed in accordance with the invention.

DETAILED DESCRIPTION OF THE INVENTION

Referring to the FIGURE, feed is passed through a conduit 10 into a surge tank 11. The invention is applicable to various distillation processes as those skilled in the art will understand. It is used most advantageously, however, in clean-up columns such as those employed in natural gasoline plants. In particular, the process of the invention can be advantageously applied to the removal of small amounts of normal butane from an isopentane stream, or for the removal of small amounts of propane as overhead product from an isobutane stream. Such separations are oftentimes employed in the treatment of depropanized or debutanized products in natural gasoline fractionation plants.

From the surge tank 11, the feed passes through a conduit 12, a feed pump 13 and a conduit 14 to an intermediate or feed tray of a fractionation column 15. In the example shown, the impurity to be removed is the more volatile component, which passes through an overhead line 16 to a condenser-cooler 17. Thence, it passes to an accumulator 18 from which a portion is returned to the column as reflux through a conduit 19 and the remainder is discharged through an overhead product conduit 20.

The purified bottoms product is discharged from the fractionation column 15 through a conduit 21 and passes to a product discharge conduit 22. In the event that the impurity is less volatile than the material from which it is to be separated, the impurity will, of course, be the bottoms product and the stream to be purified will be the overhead product.

In accordance with the invention, a composition analyzer-controller, such as a chromatographic analyzer 23-controller 24, produces a control signal responsive to the composition of the material passing through the product discharge conduit 22. This signal normally passing through a selector relay 25, to be described hereinafter, actuates an automatic flow control assembly 26, by providing the setpoint thereto, in bypass conduit 27 connecting the feed conduit 12 to the product discharge conduit 22.

When the bottoms product is of greater purity than required, the signal from controller 24 actuates relay 25 and effects an opening, preferably stepwise, of the flow control assembly 26, thus permitting a portion of the feed to bypass the column through the conduit 27. So long as the composition of the product stream passing through the conduit 22 is greater than the desired product purity, the controller 24 acts to increase the flow rate of feed passing through the conduit 27 preferably in an intermittent stepwise fashion, thus increasing the amount of feed bypassing the fractionation column. Conversely, when the product composition has a higher than desired concentration of impurities therein, the assembly 26 is actuated preferably in stepwise fashion to close the valve and reduce the flow rate of bypassed material. The intermittent function of controller 24 is principally to prevent "hunting." Since it operates in a stepwise fashion, there are long periods of time in which no change in the actuation of the flow control assembly 26 is required, thus reducing transient behavior of the system. If this action were not interposed, the flow rate of bypassed feed would continuously change with variations in feed composition, flow rate and the fractionator's separating ability. A suitable intermittent controller is described in U.S. Pat. No. 3,067,766.

The surge tank 11 is provided with a normal level controller 28, including an intermittent control feature if desired, which actuates the flow control assembly 29 in the feed conduit 14 by set point manipulation so as to pass sufficient feed to the column to maintain a desired normal level in the surge tank 11. The flow controller 29 may be adjusted to provide a predetermined minimum quantity of feed to the column 15 at all times. Alternatively, the system may be so adjusted that the flow control 29 is completely closed when the purity of the feed and bottoms product are such that all of the feed passes through the bypass conduit 27. In this case, the column 15 operates on total reflux as will be explained hereinafter.

It is a feature of the invention that the surge tank 11 is further provided with a low level controller 30. This unit produces a control signal which, by means of selector relay 25, overrides the normal control action for analyzer controller 24 when the level in the surge tank falls below a predetermined value. Responsive to such actuation of the relay 25, the flow of feed through the flow control assembly 26 and bypass conduit 27 is regulated in accordance with the liquid level in the surge tank 11 and the set point provided to the controller 30. Thus, regardless of the purity of the product stream, none of the feed is bypassed when the level in the surge tank 11 is abnormally low, this action being effected by selective operation of relay 25 through comparison of its two input signals. Suitable selective relays are available from several instrumentation manufacturers.

In the example shown, the column overhead vapor passing through the conduit 16 is split into two streams. One portion passes through the cooler-condenser 17 to the accumulator 18 while the remainder bypasses the condenser 17 and passes to the accumulator through a conduit 31. The flow of overhead vapor to the condenser 17 and the liquid therefrom is regulated by a pressure control assembly 32 which opens and closes the valve responsive to changes in pressure at the top of the fractionation column 15. The flow rate of overhead vapor passing through the conduit 31 is regulated by a pressure control assembly 33 responsive to the pressure in the accumulator 18. In this fashion, the degree of reflux cooling and warm-up is regulated to provide the proper pressures at the top of the fractionation column 15 and in accumulator 18.

As previously noted, a portion of the overhead condensate is returned to the column as reflux through the conduit 19. This is effected by a reflux pump 34 in the conduit 18, and flow therethrough is controlled by flow control assembly 35 actuated by a ratio controller 36. The controller 36 functions as hereinafter explained to automatically regulate the rate of column reflux.

The remainder of the overhead product is discharged through the conduit 20 which incorporates a flow control valve 37 actuated by the signal from liquid level controller 38 on the accumulator 18. The latter system operates in well understood fashion to regulate the rate of withdrawal of overhead product so as to maintain a desired liquid level in the accumulator 18.

The necessary reboiler heat for the column 15 is supplied, in the example shown, by steam which enters the bottom of the column through a conduit 40, and passes through a heat exchange coil to a condensate discharge conduit 41. The flow rate of the steam is regulated by a flow control valve 42 which, in turn, is actuated by a level controller 43 connected to the lower part of the fractionation column 15. The flow of steam is thus regulated to provide a constant liquid level in the reboiler of the fractionation column.

The rate of discharge of bottoms product from the column 15 is controlled by a flow control assembly 44 regulated by a ratio controller 45. The ratio controllers 36 and 45 are actuated by a signal from the flow control assembly 29 so as to maintain the rate of reflux and bottoms product take-off in desired ratios to the column feed rate. Normally, the ratio controller 36 or assembly 35 is adjusted so that a minumum amount of reflux passes to the column at all times. This permits operation of the column on total reflux even though no feed passes to the column through the conduit 14. Thus, if the purity of the feed is such that no separation is required in the column 15 to remove that impurity, the column 15 operates at total reflux of a minimum rate but ready for full scale operation.

As shown, the composition analyzer 23 is a chromatographic unit and accordingly produces a signal related to the composition of the blended product stream. Assuming that the bottoms product exceeds the desired purity, the controller 24 and selector relay 25 order the bypass of the requisite flow rate of feed around the column to blend down to the desired product specification. Other types of composition analyzers, such as differential refractometers, infrared analyzers and the like, can similarly be employed to analyze the blended product and provide a measurement signal to the analyzer controller 24.

It will be apparent that I have achieved the objects of the invention in providing controlled bypassing of the maximum amount of feed around column 15 without permitting the blended product to go off-specification. This provides maximum economy in fractionation column utilities, specifically, the steam supplied to the column through the conduit 40, the reflux condensing-cooling effected by the unit 17 and the horsepower consumed in operating the reflux pump 34. The intermittent control action, if incorporated in controllers 24 and 28, will function effectively to provide a stepwise intermittent adjustment of feed through the feed conduit 14 and the bypass conduit 27, this latter action being over-ridden by the signal from the low level controller 30 and selector relay 25 when the level in the surge tank 11 falls below the lower predetermined value.

The process of the invention has been found to provide substantial economies in utility costs in fractionations required of a natural gasoline plant. In one instance, feed to the fractionation system was 9,500 barrels per day of isopentane containing small quantities of normal butane. Sufficient normal butane was removed at all times to make the isopentane product meet specification limits while column utility costs were decreased through bypassing a portion of the feed to the bottoms product conduit.

In another instance, the process of the invention was utilized in separating small amounts of propane as overhead product from a feedstream of 10,000 barrels per day of isobutane.

From the foregoing description, it will be apparent that the process is also applicable to fractionators where small amounts of a less volatile impurity are removed as bottoms product while the purified stream is recovered as overhead product. In this case, a maximum amount of feed is bypassed to the overhead product line without permitting the overhead product to go off specification. Finally, it will be apparent that the process is applicable to various more complex distillations where the purity of one stream withdrawn from the system is critical and a certain amount of feed can bypass the column without making the purity of the critical component go off specification.

Other variations and modifications of this invention will be apparent to those skilled in the art without departing from the spirit and scope of the invention.

I claim:

1. A process of continuously operating a fractional distillation zone to achieve desired purification of a feed stream having an impurity removable therefrom by fractional distillation while minimizing the energy requirements for the operation of said fractional distillation zone, which process comprises bypassing a first portion of said feed stream around said fractional distillation zone, passing a second portion of said feed stream to said fractional distillation zone as the feed thereto, withdrawing an overhead stream from an upper portion of said fractional distillation zone, withdrawing a bottoms stream from a lower portion of said fractional distillation zone, one of said overhead stream or said bottoms stream having a lower concentration therein of said impurity than said feed stream and the other of said overhead stream or said bottoms stream having a higher concentration therein of said impurity than said feed stream, admixing the thus bypassed first portion of said feed stream with at least a portion of said one of said overhead or said bottoms stream having the lower concentration of said impurity therein than said feed stream to form a product stream, analyzing said product stream and establishing a first signal representative of the concentration of said impurity in said product stream, withdrawing said product stream as a product of said process, controlling the rate of flow of said first portion of said feed stream responsive to said first signal to maintain the concentration of said impurity in said product stream below a predetermined value, and controlling the rate of flow of said second portion of said feed stream so that said second portion is the remainder of said feed stream which is available for processing in said fractional distillation zone, thereby minimizing the amount of said feed stream processed through said fractional distillation zone, wherein said feed stream is passed in liquid form into a surge zone and said first and second portions of said feed stream are withdrawn from said surge zone, and wherein the flow rate of said second portion of said feed stream to said fractional distillation zone is manipulated responsive to the liquid level of said liquid feed stream in said surge zone to maintain said liquid level at a desired normal value.

2. A process in accordance with claim 1 further comprising returning to said fractional distillation zone all of said other of said overhead or said bottoms stream having the higher concentration of said impurity when the flow rate of said second portion of said feed stream to said fractional distillation zone is reduced below a predetermined minimum value, and reducing the flow rate of said one of said overhead or said bottoms stream having the lower concentration of said impurity in a manner responsive to a reduction in the flow rate of said second portion to said fractional distillation zone.

3. A process in accordance with claim 1 further comprising overriding the control of said flow rate of said first portion of said feed stream responsive to said first signal when said liquid level in said surge zone falls below a predetermined minimum desirable value, and during such overriding action controlling the rate of flow of said first portion of said feed stream responsive to the difference between said predetermined minimum desirable value and the actual value of liquid level in said surge zone.

4. A process in accordance with claim 1 wherein said overhead stream contains a higher concentration of said impurity than said feed stream, and said bottoms stream contains a lower concentration of said impurity than said feed stream, and wherein the flow rate of said first portion of said feed stream is increased in intermittent stepwise fashion when the concentration of said impurity in said product stream is below said predetermined value therefor and is decreased in intermittent stepwise fashion when the concentration of said impurity in said product stream is greater than said predetermined value therefor.

5. A process in accordance with claim 1 wherein said overhead stream contains a lower concentration of said impurity than said feed stream, and said bottoms stream contains a higher concentration of said impurity than said feed stream, and wherein the flow rate of said first portion of said feed stream is increased in intermittent stepwise fashion when the concentration of said impurity in said product stream is below said predetermined value therefor and is decreased in intermittent stepwise fashion when the concentration of said impurity in said product stream is greater than said predetermined value therefor.

* * * * *